BEST AVAILABLE COPY

CHARLES F. DIETERICH & AUGUST SCHÜSSLER.

Improvement in Air-Tight Joints for Gas-Retorts.

No. 4,900 Reissued May 14, 1872.

Witnesses:-
Arden S. Fitch.
A. Lennington Mills

Inventors-
Charles F. Dieterich
August Schüssler
By J. R. Fitch
their attorney.

BEST AVAILABLE COPY 4,000

UNITED STATES PATENT OFFICE.

CHARLES F. DIETERICH AND AUGUST SCHÜSSLER, OF NEW YORK, N. Y.

IMPROVEMENT IN AIR-TIGHT JOINTS FOR GAS-RETORTS.

Specification forming part of Letters Patent No. 115,686, dated June 6, 1871; reissue No. 4,000, dated May 14, 1872.

*To all whom it may concern:*

Be it known that we, CHARLES F. DIETERICH and AUGUST SCHÜSSLER, both of the city, county, and State of New York, have invented a new and improved device for making the joints of lids or man or hand holes on gas-retorts air-tight; and we do hereby declare that the following is a full and exact description thereof, reference being had to the accompanying drawing and to the letters of reference marked thereon.

Heretofore man-hole plates or lids on gas-retorts, which are subjected to a high temperature, have been closed air or gas tight against the retort by interposing a layer of loam between it and the retort, and by screwing the lid against the loam, or by interposing a packing of copper between the lid and face of the neck of the retort, either placed in a groove or otherwise. The nature of our invention consists in applying, in a practical manner, an elastic packing, which, while it is capable of withstanding a high degree of heat, will by its elasticity always secure a gas-tight joint upon repeated removal and replacement of the lid. It also consists in securing the said elastic packing in its place, so that the lid may be repeatedly taken off and put on without impairing the integrity or efficiency of the same.

To enable others skilled in the art to make and use our invention we will proceed to describe its construction and operation.

Figure 1:
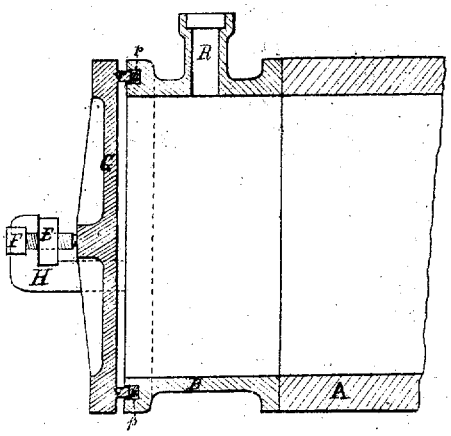
Figure 3:
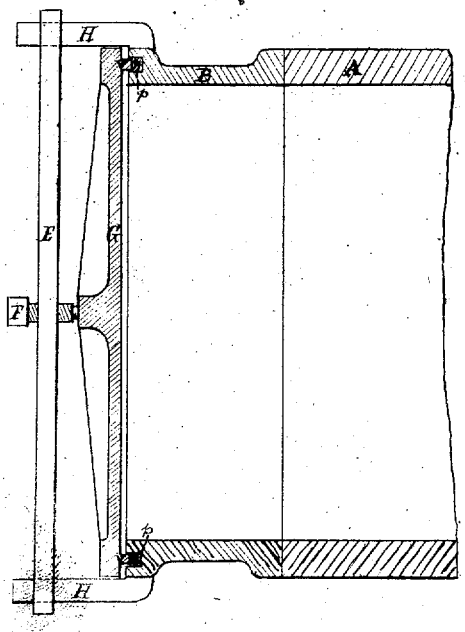
Figure 2:
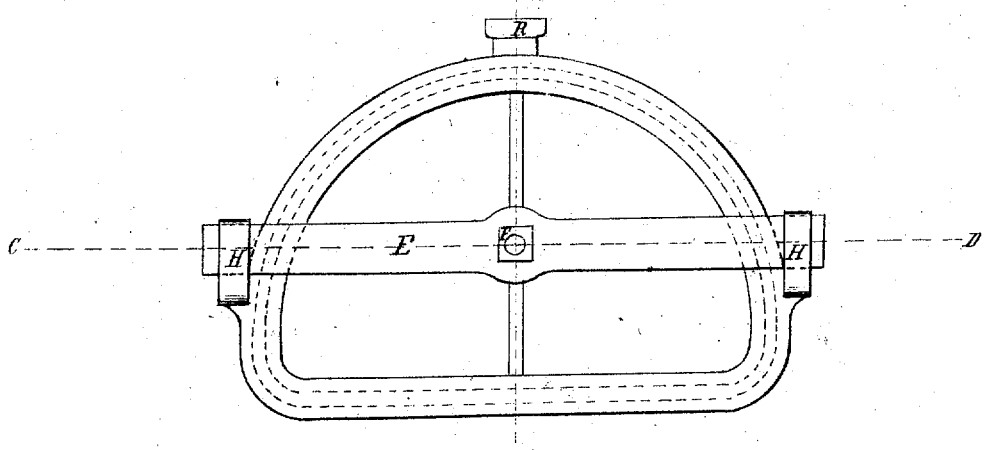

Figure 1 is a longitudinal section of the end of a retort with our packing applied. Fig. 2 is an end view of the same; Fig. 3, a longitudinal section through C D of it.

A is the end of the retort as made of fire-clay; B, a short cast-iron neck or mouth piece of the same internal section as the retort, which is fastened properly to it, and which is closed by the lid G, the latter being tight against B by means of the loose bar E and the bolt F, (see Figs. 2 and 3.) The neck B is provided with one or more recesses or grooves, *p p*, on the surface of its opening. These recesses are filled with an elastic packing, which will withstand high temperature without losing its elasticity—such, for instance, as fibers of asbestus or other equivalent elastic material. The lid G is provided with a projecting rim or a corresponding number of rims, which fit easily into the said recesses *p p*. The lid, being pressed by the screw-bolt F, with this projection against the packing in *p p*, will thus close the retort perfectly air-tight, and the lid may be taken off and put on again without disturbing or injuring the packing any. The same result may, however, be obtained by making the groove or recess *p p* in the man-hole plate or lid and a corresponding projecting rim on the end of the neck or mouth-piece B, it being substantially the same construction. The mouth-piece B we furnish with a short nozzle, R, which is closed on top with a stopper of clay or loam, or which may be closed with a suitable safety-valve, so that the retort may be relieved of any excessive pressure of gases through this nozzle in case the standing pipe leading the gases from the retort should become clogged up.

What we claim as our invention, and desire to secure by Letters Patent, is—

One or a number of recesses or grooves and corresponding projecting rims in combination with the elastic packing, designated on joints of man or hand hole-plates or lids for gas-retorts which are subjected to a high temperature, as and for the purpose specified.

CHAS. F. DIETERICH.
AUG. SCHÜSSLER.

Witnesses:
WM. C. REDDY,
A. LIVINGSTON MILLS.